United States Patent
Karighattam et al.

(10) Patent No.: US 7,164,681 B2
(45) Date of Patent: *Jan. 16, 2007

(54) MECHANISM TO STRIP LARQ HEADER AND PRESERVE LARQ HEADER IN STATUS FRAME

(75) Inventors: Kishore Karighattam, Cupertino, CA (US); Peter Chow, San Jose, CA (US); Robert Williams, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 917 days.

This patent is subject to a terminal disclaimer.

(21) Appl. No.: 09/905,132

(22) Filed: Jul. 13, 2001

(65) Prior Publication Data

US 2003/0012213 A1    Jan. 16, 2003

(51) Int. Cl.
*H04L 12/28* (2006.01)

(52) U.S. Cl. .................. 370/394; 370/389; 370/428; 370/392; 714/746; 714/748

(58) Field of Classification Search .............. 370/394, 370/389, 392, 474, 401; 714/746, 748, 749, 714/750
See application file for complete search history.

(56) References Cited

U.S. PATENT DOCUMENTS

| | | | | |
|---|---|---|---|---|
| 5,935,268 A * | 8/1999 | Weaver | | 714/758 |
| 5,999,541 A * | 12/1999 | Hinchey et al. | | 370/466 |
| 6,301,681 B1 * | 10/2001 | Chen et al. | | 714/751 |
| 6,335,933 B1 * | 1/2002 | Mallory | | 370/394 |
| 6,414,956 B1 * | 7/2002 | Szczepanek | | 370/392 |
| 6,657,757 B1 * | 12/2003 | Chang et al. | | 370/471 |
| 6,724,725 B1 * | 4/2004 | Dreyer et al. | | 370/231 |
| 6,735,649 B1 * | 5/2004 | Williams et al. | | 710/65 |
| 6,775,283 B1 * | 8/2004 | Williams | | 370/392 |
| 6,781,989 B1 * | 8/2004 | Acharya | | 370/392 |
| 6,788,681 B1 * | 9/2004 | Hurren et al. | | 370/389 |
| 6,798,775 B1 * | 9/2004 | Bordonaro et al. | | 370/392 |
| 6,810,520 B1 * | 10/2004 | Lu et al. | | 719/310 |
| 6,829,250 B1 * | 12/2004 | Voit et al. | | 370/467 |
| 6,839,345 B1 * | 1/2005 | Lu et al. | | 370/365 |
| 6,877,043 B1 * | 4/2005 | Mallory et al. | | 709/251 |
| 6,996,124 B1 * | 2/2006 | Chow | | 370/466 |

* cited by examiner

*Primary Examiner*—Ricky Q. Ngo
*Assistant Examiner*—Andrew C. Lee
(74) *Attorney, Agent, or Firm*—Winstead Sechrest & Minick, P.C.

(57) ABSTRACT

The present invention provides a method for supporting frame priority in a home phone line network. The method includes: detecting a limited automatic repeat request (LARQ) header in a frame with a priority tag; stripping the LARQ header and a frame check sequence (FCS) in the frame with the priority tag; recalculating the FCS for the stripped frame with the priority tag; and adding the recalculated FCS to the stripped frame with the priority tag. The method strips the LARQ header from a HPNA frame with the priority tag before it is sent to an Ethernet controller. By stripping the LARQ header, the Ethernet controller will correctly recognize the priority tag and send the frame to the appropriate priority queue. In this manner, frame priority is supported.

12 Claims, 4 Drawing Sheets

MECHANISM TO STRIP LARQ HEADER AND PRESERVE LARQ HEADER IN STATUS FRAME

FIELD OF THE INVENTION

The present invention relates to received data packets in a network, and more particularly to the removing unwanted header information to from received data packets in the network.

BACKGROUND OF THE INVENTION

Home networks are becoming more common and desirable for connecting computers within a home. One type of home network is the home phone line network which uses telephone lines typically installed in residence homes for communication between computers in the home. The Home Phone Line Networking Alliance (HPNA) has published a specification to standardize the behavior of home phone line networks.

FIG. 1 illustrates a home phone line network in accordance with the present invention. The preferred embodiment of the network complies with the Home Phoneline Networking Alliance specification version 2.0 (HPNA 2.0). The network allows multiple computers to communicate through telephone wires typically installed in residential homes. The network comprises a control chip 100. The chip 100 further comprises a Media Independent Interface (Mu) 106, a Media Access Control (MAC) 108, and a Physical Layer (PHY) 110. The chip 100 implements the HPNA 2.0 specification. The chip 100 receives a signal containing data packets through the telephone wires via a phone jack 102. There is an analog front end (AFE) 104 which processes the signal between the chip 100 and the telephone wires. The chip 100 then processes the packets received in the signal from the AFE 104, and outputs a signal to the Host MAC 112 or to an Ethernet controller 114.

As is known in the art, a priority tag, or "Q Tag", may be inserted into the header of a frame to provide information which may be used to prioritize the frame in relation to other frames. However, under HPNA 2.0, the frame may contain an additional 8-byte Limited Automatic Repeat Request (LARQ) in its header before the priority tag. The LARQ conveys link layer priority information and provides a negative acknowledgment protocol to increase the speed of frame retransmission. The Ethernet protocol used by the Ethernet controller 112 does not recognize or expect the LARQ header. When a HPNA frame with the LARQ header and the Q Tag is sent to the Ethernet controller 114, the Ethernet controller 114 counts the bytes to the expected Q Tag location, but the Q Tag is actually 8 bytes further down the frame. The Ethernet controller 114 thus erroneously believes the frame has no priority information.

Accordingly, there exists a need for a mechanism to strip the LARQ header to support frame priority. The present invention addresses such a need.

SUMMARY OF THE INVENTION

The present invention provides a method for supporting frame priority in a home phone line network. The method includes: detecting a limited automatic repeat request (LARQ) header in a frame with a priority tag; stripping the LARQ header and a frame check sequence (FCS) in the frame with the priority tag; recalculating the FCS for the stripped frame with the priority tag; and adding the recalculated FCS to the stripped frame with the priority tag. The method strips the LARQ header from a HPNA frame with the priority tag before it is sent to an Ethernet controller. By stripping the LARQ header, the Ethernet controller will correctly recognize the priority tag and send the frame to the appropriate priority queue. In this manner, frame priority is supported.

DETAILED DESCRIPTION

The present invention provides a mechanism to strip the LARQ header to support frame priority. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 2 through 4 in conjunction with the discussion below.

Figure 1:
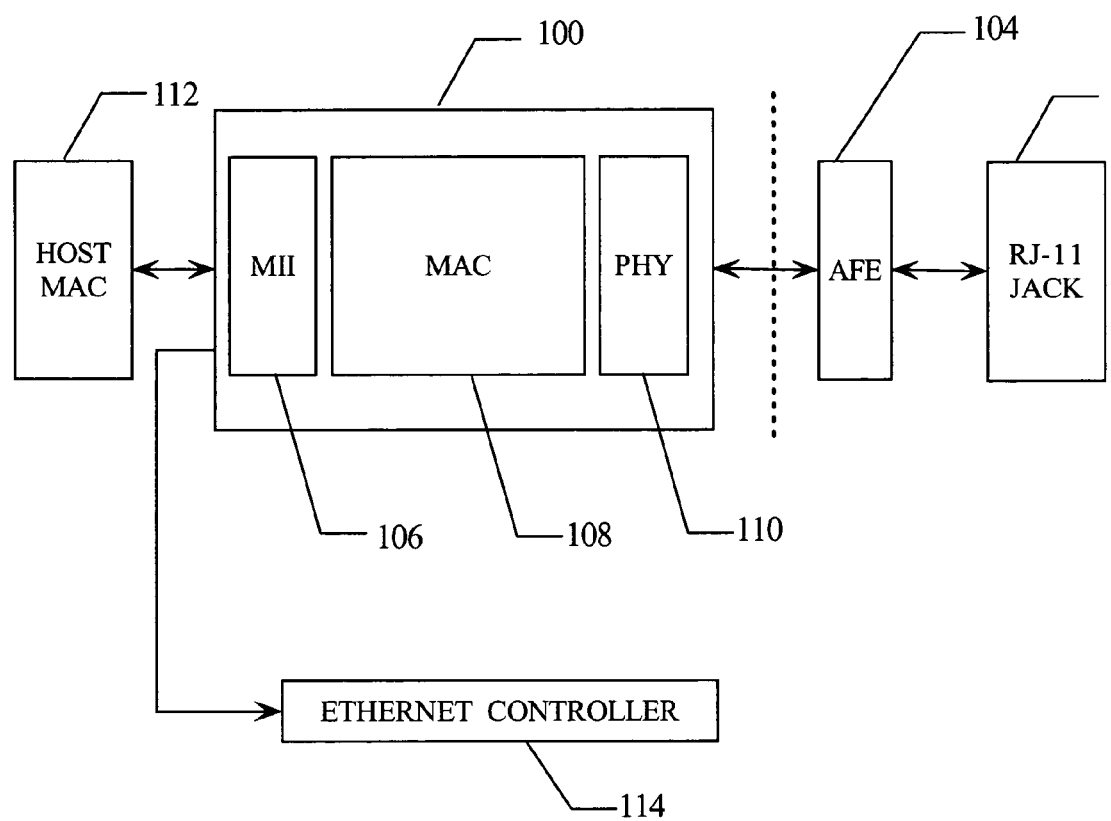
FIG. 1 illustrates a home phone line network in accordance with the present invention.
Figure 2:
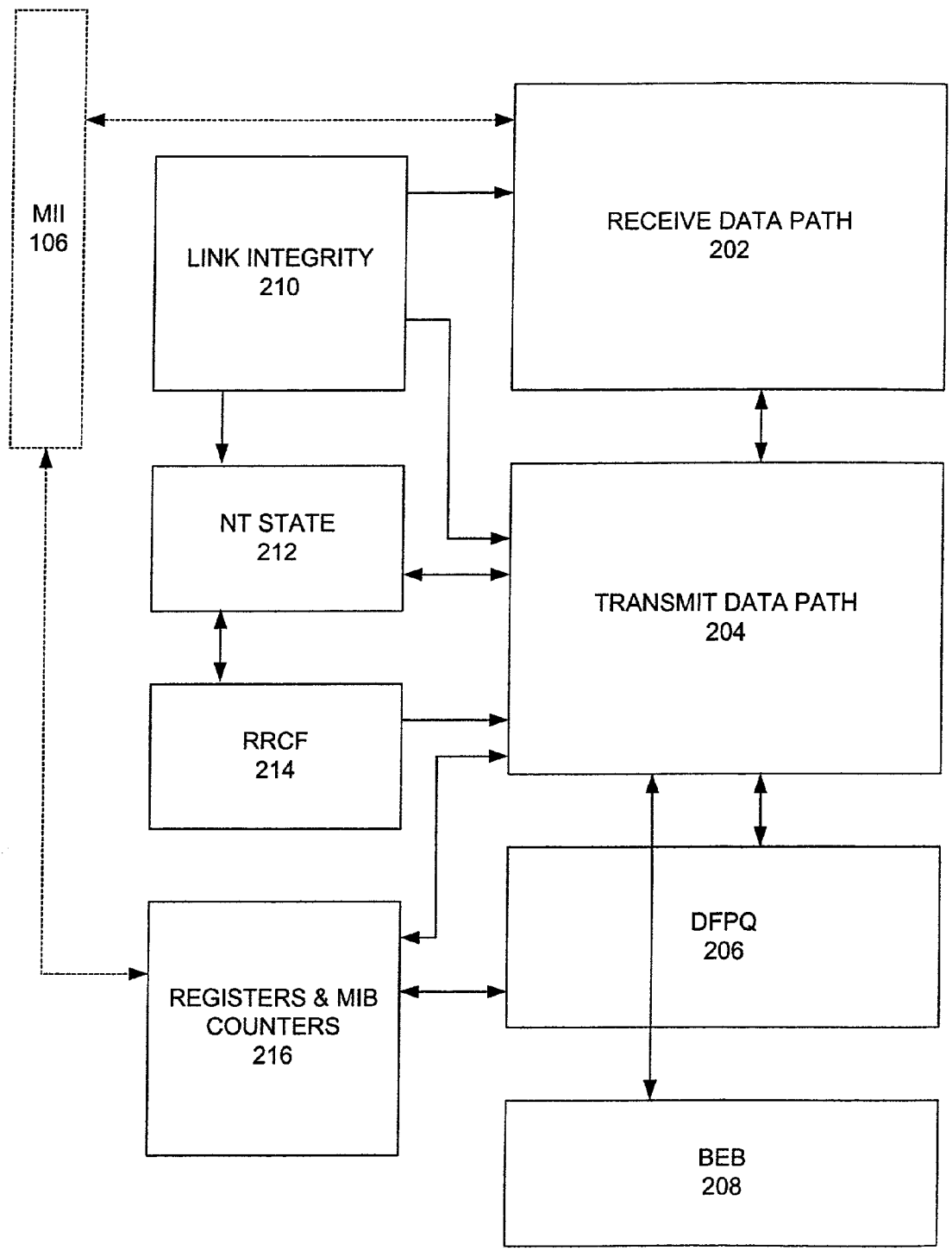
FIG. 2 illustrates a preferred embodiment of a MAC in accordance with the present invention.

FIG. 2 illustrates a preferred embodiment of a MAC in accordance with the present invention. The MAC comprises a Receive Data Path 202, a Transmit Data Path 204, a Distributed Fair Priority Queuing (DFPQ) 206, a Binary Exponential Backoff (BEB) 208, a Link Integrity 210, a Network State 212, a Rate Request Control Frame (RRCF) 214, a plurality of registers and Management Information Base (MIB) counters 216.

The Receive Data Path 202 receives data packets from the PHY 110 and sends data packets to the Ethernet controller 114 via the MII 106. In the preferred embodiment, after each data packet sent by the Receive Data Path 202, another packet, referred to herein as a "frame status frame", is sent immediately following. The frame status frame contains certain status information required by subsequent processes.

The Transmit Data Path 204, which receives data packets from the MII 106 and transmits them to the PHY 110.

The DFPQ 206 and the BEB 208 provide collision resolution. The HPNA 2.0 specification supports both a 10 megabyte per second (mbps) data rate and a 1 mbps data rate. The DFPQ 206 provides collision resolution for the 10 mbps data rate, while the BEB 208 provides collision resolution for the 1 mbps data rate. In the preferred embodiment, the PHY 110 will provide a collision detect signal. Either the DFPQ 206 or the BEB 208 will then attempt to resolve the collision.

The Link Integrity 210 monitors the physical network conditions. In the preferred embodiment, the Link Integrity 210 updates a link status bit in a link register. The Link Integrity 210 also sends link packets in accordance with HPNA 2.0.

The Network State 212 monitors the current mode of the MAC 108, i.e., whether the MAC 108 is operating in the 10 mbps data rate mode ("10M8") or the 1 mbps data rate mode ("1M8").

The RRCF block (214) sends a RRCF whenever the MAC 108 transitions between data rates. The RRCF is used to perform the rate negotiation function, i.e., to determine what is the data rate to communicate between different stations in a home phone line network.

The registers and MIB counters 216 provides programmability to the MAC 108 and handles error event counting.

Figure 3:
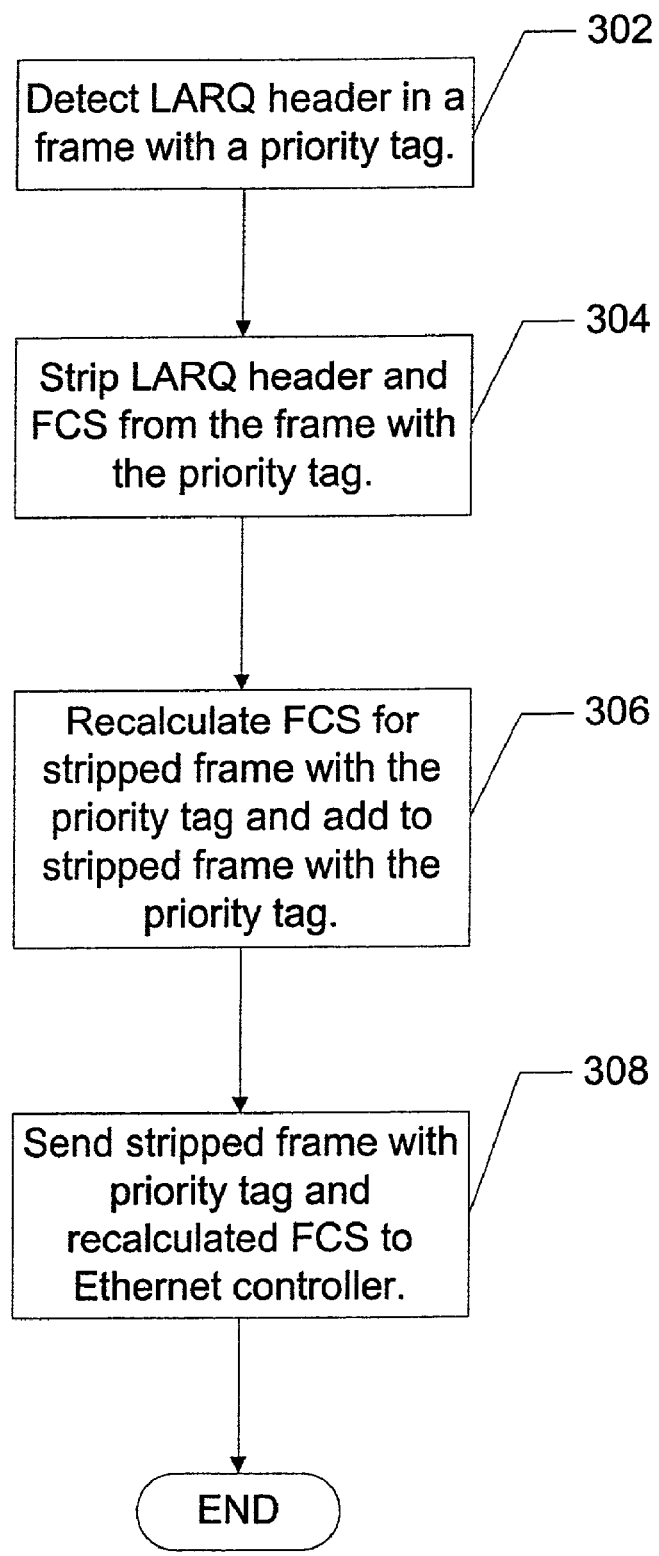
FIG. 3 is a flowchart illustrating a preferred embodiment of a method to strip the LARQ header to support frame priority in accordance with the present invention.

FIG. 3 is a flowchart illustrating a preferred embodiment of a method to strip the LARQ header to support frame priority in accordance with the present invention. In the preferred embodiment, the method is provided as part of the Receive Data Path 202. First, the Receive Data Path detects the LARQ header in a frame with a priority tag, or Q Tag, via step 302. Next, the LARQ header and the frame check sequence (FCS) of the frame with the priority tag are stripped, via step 304. The FCS is the last four bytes of a frame which is used to determine whether or not the frame contains errors. In the preferred embodiment, the information in the stripped LARQ header is placed into the frame status frame which will immediately follow the stripped frame with the priority tag. In this way, the LARQ header information is still available to other processes. The Receive Data Path 202 then recalculates the FCS for the stripped frame with the priority tag and adds it to the stripped frame with the priority tag, via step 306. This recalculation is necessary because otherwise, the Ethernet controller 114 would erroneously determine that the stripped frame with the priority tag has errors because the LARQ header is missing. Then, the stripped frame with the priority tag and the recalculated FCS is sent to the Ethernet controller 114, via step 308.

In the preferred embodiment, this stripping of the LARQ header may be user programmable. For example, the setting of a register is used to activate the stripping of the LARQ header as described above.

In the preferred embodiment, the method to strip the LARQ header is implemented in hardware. However, one of ordinary skill in the art will understand that the method may be implemented in software, or a combination of hardware and software, without departing from the spirit and scope of the present invention.

Figure 4:
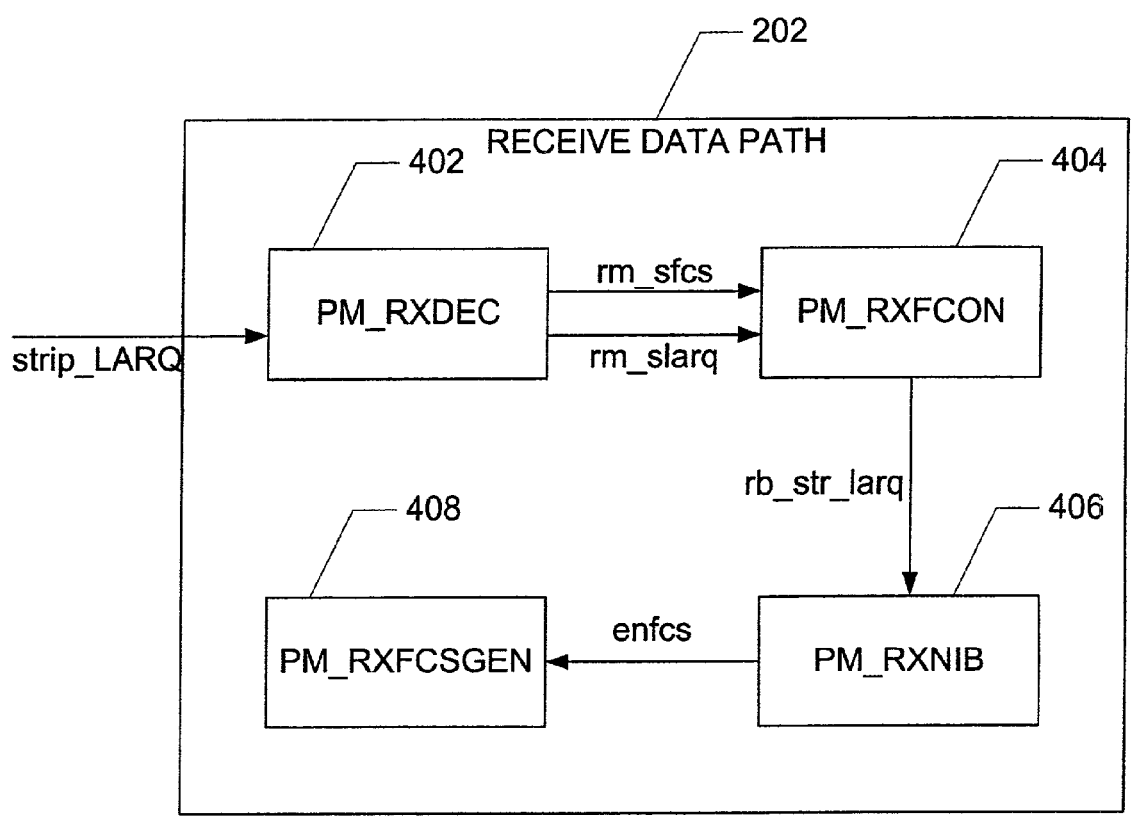
FIG. 4 illustrates a preferred embodiment of a Receive Data Path which strips the LARQ header to support frame priority in accordance with the present invention.

FIG. 4 illustrates a preferred embodiment of a Receive Data Path which strips the LARQ header to support frame priority in accordance with the present invention. The Receive Data Path 202 comprises a PM_RXDEC logic block 402, a PM_RXFCON logic block 404, a PM_RXNIB logic block 406, and a PM_RXFCSGEN logic block 408. When a frame with a LARQ and a Q Tag is received, the registers in the Registers and MIB Counters 216 asserts a signal, strip_LARQ, to the PM_RXDEC 402 to indicate that the LARQ is enabled so it must be stripped from the frame with the Q Tag, via step 302. The PM_RXDEC 402 then asserts the rm_sfcs signal and the rm_slarq signal to the PM_RXFCON 404. The asserted rm_sfcs signal indicates that the FCS in the frame with the Q Tag is to be stripped. The asserted rm_slarq signal indicates that the LARQ in the frame with the Q Tag is to be stripped. The PM_RXFCON 404 then strips the FCS and the LARQ, via step 304. Next, the PM_RXFCON 404 asserts a rb_str_larq signal to the PM_RXNIB 406. The asserted rb_str_larq signal indicates that the LARQ has been stripped from the frame with the Q Tag. The PM_RXNIB 406 generates the frame control frame accordingly. The PM_RXNIB 406 asserts an enfcs signal to the PM_RXFCSGEN 408. The asserted enfcs signal enables FCS recalculation for the stripped frame with the Q Tag. The PM_RXFCSGEN 408 then recalculates the FCS for the stripped frame with the Q Tag, via step 306. The recalculated FCS is added to the stripped frame with the Q Tag, and this frame is sent to the Ethernet controller 112, via step 308.

A method to strip the LARQ header to frame priority has been disclosed. The method strips the LARQ header from a HPNA frame with a priority tag before it is sent to an Ethernet controller. By stripping the LARQ header, the Ethernet controller will correctly recognize the priority tag and send the frame to the appropriate priority queue. In this manner, frame priority is supported.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for supporting frame priority in a home phone line network, comprising the steps of:
   (a) detecting a limited automatic repeat request (LARQ) header in a frame with a priority tag;
   (b) stripping the LARQ header and a frame check sequence (FCS) in the frame with the priority tag;
   (c) recalculating the FCS for the stripped frame with the priority tag; and
   (d) adding the recalculated FCS to the stripped frame with the priority tag.

2. The method of claim 1, wherein the stripping step (b) further comprises:
   (b1) placing information in the LARQ header in a frame status frame which will follow the stripped frame with the priority tag.

3. The method of claim 1, further comprising:
   (e) sending the stripped frame with the priority tag and the recalculated FCS to an Ethernet controller.

4. A method for supporting frame priority in a home phone line network, comprising the steps of:
   (a) detecting a limited automatic repeat request (LARQ) header in a frame with a priority tag;
   (b) stripping the LARQ header and a frame check sequence (FCS) in the frame with the priority tag;
   (c) recalculating the FCS for the stripped frame with the priority tag;
   (d) adding the recalculated FCS to the stripped frame with the priority tag;
   (e) sending the stripped frame with the priority tag and the recalculated FCS to an Ethernet controller; and
   (f) sending the stripped frame with the priority tag and the recalculated FCS to an appropriate priority queue according to the priority tag.

5. A home phone line controller, comprising:
   a first logic block for detecting a LARQ header in a frame with a priority tag;
   a second logic block for stripping the LARQ header and a FCS in the frame with the priority tag; and
   a third logic block for recalculating the FCS for the stripped frame with the priority tag and for adding the recalculated FCS to the stripped frame with the priority tag.

6. The controller of claim 5, wherein an asserted first signal to the first logic block indicates that the LARQ header is enabled and must be stripped from the frame with the priority tag.

7. A home phone line controller, comprising:
  a first logic block for detecting a LARQ header in a frame with a priority tag;
  a second logic block for stripping the LARQ header and a FCS in the frame with the priority tag; and
  a third logic block for recalculating the FCS for the stripped frame with the priority tag and for adding the recalculated FCS to the stripped frame with the priority tag;
  wherein the first logic block asserts a second signal and a third signal to the second logic block, wherein the second signal indicates that the FCS is to be stripped from the frame with the priority tag, wherein the third signal indicates that the LARQ header is to be stripped from the frame with the priority tag.

8. The controller of claim 5, wherein an asserted fourth signal to the third logic block enables the recalculation of the FCS.

9. A system, comprising:
  an Ethernet controller; and
  a home phone line network controller, wherein the home phone line network controller comprises:
    a first logic block for detecting a LARQ header in a frame with a priority tag;
    a second logic block for stripping the LARQ header and a FCS in the frame with the priority tag; and
    a third logic block for recalculating the FCS for the stripped frame with the priority tag and for adding the recalculated FCS to the stripped frame with the priority tag.

10. The system of claim 9, wherein an asserted first signal to the first logic block indicates that the LARQ header is enabled and must be stripped from the frame with the priority tag.

11. A system, comprising:
  an Ethernet controller; and
  a home phone line network controller, wherein the home phone line network controller comprises:
    a first logic block for detecting a LARQ header in a frame with a priority tag;
    a second logic block for stripping the LARQ header and a FCS in the frame with the priority tag; and
    a third logic block for recalculating the FCS for the stripped frame with the priority tag and for adding the recalculated FCS to the stripped frame with the priority tag;
  wherein the first logic block asserts a second signal and a third signal to the second logic block, wherein the second signal indicates that the FCS is to be stripped from the frame with the priority tag, wherein the third signal indicates that the LARQ header is to be stripped from the frame with the priority tag.

12. The system of claim 9, wherein an asserted fourth signal to the third logic block enables the recalculation of the FCS.

* * * * *